(12) United States Patent
Cofler et al.

(10) Patent No.: US 7,370,182 B2
(45) Date of Patent: May 6, 2008

(54) METHOD OF HANDLING BRANCHING INSTRUCTIONS WITHIN A PROCESSOR, IN PARTICULAR A PROCESSOR FOR DIGITAL SIGNAL PROCESSING, AND CORRESPONDING PROCESSOR

(75) Inventors: Andrew Cofler, Voreppe (FR); Anne Merlande, Saint Egreve (FR); Sebastien Ferroussat, Fontaine (FR)

(73) Assignee: STMicroelectronics SA, Montrouge (FR)

( * ) Notice: Subject to any disclaimer, the term of this patent is extended or adjusted under 35 U.S.C. 154(b) by 1147 days.

(21) Appl. No.: 10/082,816

(22) Filed: Feb. 25, 2002

(65) Prior Publication Data

US 2002/0124044 A1    Sep. 5, 2002

(30) Foreign Application Priority Data

Feb. 27, 2001   (FR)   ................................. 01 02645

(51) Int. Cl.
  *G06F 7/38*    (2006.01)
  *G06F 9/00*    (2006.01)
  *G06F 9/44*    (2006.01)
  *G06F 15/00*   (2006.01)

(52) U.S. Cl. ................. 712/234; 712/233; 712/237; 712/24; 712/26

(58) Field of Classification Search ............. 712/234, 712/233, 237, 24, 26
See application file for complete search history.

(56) References Cited

U.S. PATENT DOCUMENTS

| | | | | |
|---|---|---|---|---|
| 4,827,402 A | | 5/1989 | Wada ........................ | 364/200 |
| 5,353,421 A | * | 10/1994 | Emma et al. ............... | 712/240 |
| 5,485,587 A | * | 1/1996 | Matsuo et al. ............. | 712/234 |
| 5,928,357 A | * | 7/1999 | Underwood et al. ........ | 712/235 |
| 6,526,502 B1 | * | 2/2003 | Col et al. ................... | 712/239 |
| 6,543,002 B1 | * | 4/2003 | Kahle et al. ................. | 714/10 |

FOREIGN PATENT DOCUMENTS

| | | |
|---|---|---|
| EP | 0 133 477 | 2/1985 |
| EP | 0 689 131 | 12/1995 |
| EP | 0 840 209 | 5/1998 |
| EP | 1 050 805 | 11/2000 |
| WO | 99/08184 | 2/1999 |

OTHER PUBLICATIONS

Patterson et al., Computer Organization and Design: The Hardware/Software Interface—2nd ed., 1998.*

(Continued)

*Primary Examiner*—Niketa Patel
*Assistant Examiner*—Jesse Moll
(74) *Attorney, Agent, or Firm*—Lisa K. Jorgenson; Allen, Dyer, Doppelt, Milbrath & Gilchrist, P.A.

(57) ABSTRACT

A processor includes a program memory containing program instructions, and a processor core including several processing units and a central unit. The central unit, upon receipt of a program instruction, issues corresponding instructions to the various processing units. The processor core is clocked by a clock signal. A branching instruction received by the central unit, in the course of a current cycle, is processed in the course of the current cycle.

29 Claims, 9 Drawing Sheets

OTHER PUBLICATIONS

Moore C.R. "The Power PC™ 601 Microprocessor"; proceedings of the spring computer society international conference, San Francisco, CA published on Feb. 22, 1993, Publication No. XP000379036; pp. 109-116.

Toyohiko Yoshida et al., "A Strategy for Avoiding pipeline Interlock Delays in a Microprocessor", published by LSI Research and Development Laboratory on Sep. 17, 1990; Publication No. XP 000201400; pp. 14-19; ISBN: 0-8186-2079-X.

\* cited by examiner

METHOD OF HANDLING BRANCHING INSTRUCTIONS WITHIN A PROCESSOR, IN PARTICULAR A PROCESSOR FOR DIGITAL SIGNAL PROCESSING, AND CORRESPONDING PROCESSOR

FIELD OF THE INVENTION

The invention relates to processors, especially processors for digital signal processing (DSP), and, more particularly, to handling branching instructions within such a processor.

BACKGROUND OF THE INVENTION

A processor generally includes several processing units operating in parallel. Processing units conventionally include an arithmetic and logic module, an addressing module and a branch-handling module. In addition to the processing units, the processor generally includes a central unit (control unit), which communicates with the program memory and issues individual instructions, also widely called micro-instructions, to the various processing units.

Among the instructions issued to the processing units, instructions called "branching instructions" are issued to the module or to the unit handling branching. A branching instruction is an instruction implying a break in sequence in the normal sequencing of the instructions. In other words, as is conventional, a program counter is configured to issue successive values corresponding to consecutive addresses in the program memory, a branching instruction will have the effect of modifying the current value of the program counter, at a given instant and in such a way, as to force the address pointer to a given address of the program memory. Furthermore, the branching instructions can be conditional, for example guarded, as will be explained below.

All the branching instructions need to reach the branching unit before actually being processed. However, the branching unit is generally "at the bottom" of the pipelined architecture of the processor. This implies a relatively substantial latency time before a branching instruction is actually processed.

SUMMARY OF THE INVENTION

The object of the invention is to provide a mechanism for handling branching instructions which is different from that existing up to the present, and which allows an overall improvement in the branching latency. The invention applies particularly, but not necessarily, to a processor including what is known as "decoupled" architecture.

The invention thus provides a method of handling branching instructions within a processor. The processor includes a program memory containing program instructions, and a processor core including several processing units and a central unit. The central unit, on receiving a program instruction, issues corresponding instructions to the various processing units.

According to one general characteristic of the invention, with the processor core being clocked by a clock signal, a branching instruction received by the central unit in the course of a current cycle of the clock signal is processed in the course of the current cycle. Thus, according to the invention, the branching module is transferred into the central unit, which makes it possible to process the branching instructions much more rapidly.

Thus, branching instructions may use the content of one or more address-pointing registers, which are not necessarily incorporated into the central unit. For example, these address-pointing registers can be incorporated into a first processing unit, such as, the addressing unit. Shifting the branching function into the central unit poses the problem of the validity of the content of the address-pointing registers when they are incorporated into a processing unit which is other than the central unit, and when they are accessed at time cycles which are later than the current cycle in the course of which the branching instruction is examined. The invention also addresses this problem.

Thus, according to one implementation of the invention, in which a first processing unit, for example the addressing unit, contains at least one address-pointing register, and in which a branching instruction uses the content of at least one of the address-pointing registers, a check of the validity of the content of the pointing register in question is carried out at the start of the current cycle. The branching instruction is then actually received by the central unit and processed if the content is declared valid. In the opposite case, the branching instruction is kept on hold for processing (for example in a buffer register arranged at the head of the central unit) until the content is declared valid.

This validity check may, in the sense of the invention, be direct or indirect. More precisely, it can be carried out directly on the architectural pointing register contained in the addressing unit. However, it is also possible to carry it out indirectly on the architectural register. Thus, a particularly simple way of checking the validity of the content of the address-pointing registers, which is compatible with a minimum latency, includes recopying the content of each address-pointing register into a duplicated address-pointing register. The check on the validity of the content of the pointing register in question is then a check on the validity of the content of the corresponding duplicated register. The validity check takes into account the handling of the modifying instructions intended to modify the content of an address-pointing register.

Thus, according to one implementation of the invention, every time the central unit receives a modifying instruction intended to modify the content of an address-pointing register, and earlier in time than a branching instruction involving the address-pointing register, the check of validity of the content of the corresponding duplicated register takes into account whether the modifying instruction has or has not been processed by the first unit, for example, the addressing unit.

Thus, for example, in practice, every time the central unit receives a modifying instruction intended to modify the content of an address-pointing register, a counter associated with the register is incremented. Every time the addressing unit has processed the modifying instruction, the counter is decremented. When a branching instruction involving the register is ready to be issued to the central unit, the validity check includes the check on the value of the counter. The content of the duplicated register corresponding to the address-pointing register involved is declared valid if the value of the counter is equal to zero.

Among the instructions issued to the processing units, instructions called "guarded" instructions allow higher-performance writing of the program code. The use of guarded instructions in a processor is already known to a person skilled in the art, for example, from the European Patent Application No. 1,050,803. The principle of guarded instructions is briefly reiterated. A person skilled in the art may refer to the above-mentioned European Patent Application for further details, if necessary.

A guarded instruction is an instruction assigned an indication called a "guard" indication, a guard bit being capable of taking the value 0 or 1. The guarded instruction will then be executed or not executed depending on the value of the guard bit on the guard indication. All the binary values of the guard indications, possibly numbering sixteen for example, are contained in a register called a "guard-indication register". The centralized register is incorporated within a processing unit, for example, the arithmetic and logic unit, and contains the current values of the guard bits or indications, at every instant. The values of these guard indications can be modified by specific instructions called "modifying instructions".

To read the value of a guard indication associated with a guarded instruction, the processing unit which receives the guarded instruction, and which does not have direct access to the guard-indication register (for example the branching unit), requires a transfer of the value of the guard indication from the processing unit, which holds the guard-indication register. In other words, issuing a guarded instruction to a processing unit, which does not hold the guard-indication register, causes the issuing to the processing unit. The processing unit, which is the holder of the guard-indication register of an instruction called a "transmission" instruction, transmits to the processing unit, which receives the guarded instruction, the value of the guard indication associated with the guarded instruction.

The guarded instruction is kept in the header stage (output stage) of the FIFO-type (first-in/first-out) instruction memory associated with the processing unit, until the latter receives from the processing unit holding the guard-indication register, the guard-indication value associated with the guarded instruction. It is only when the processing unit, which holds the guard-indication register, has executed the transmission instruction that the corresponding value of the guard indication will be transmitted to the requesting processing unit, so that it may execute or not execute its guarded instruction.

This applies most particularly to the guarded branching instructions, in particular when the unit which holds the guard-indication register, is for example, the arithmetic and logic unit. The result is that the transfer of the guard indication from the arithmetic and logic unit to the branching module consumes yet another number of clock-signal cycles, which affects the branching latency. The invention also addresses this problem.

More precisely, according to one implementation of the invention in which a second processing unit, for example, the arithmetic and logic unit, contains a guard-indication register in the presence of a guarded branching instruction, a check on the validity of the value of the guard indication assigned to the branching instruction and contained in the guard-indication register is carried out at the start of the current cycle of the clock signal. The guarded branching instruction is actually received by the central unit and processed (executed or not executed depending on the value of the guard indication) if the value of the corresponding guard indication is declared valid. In the opposite case, the guarded branching instruction is kept on hold for processing until the value of the corresponding guard indication is declared valid.

Here again, as for the address-pointing registers, the check may be direct or indirect. Thus, in a way similar to what was set out for the recopy of the address-pointing registers, it is advantageously provided, according to one implementation of the method, that the content of the guard-indication register is recopied into a duplicated guard-indication register. The check on the validity of the value of a guard indication is then a check on the validity of the value of the corresponding guard indication contained in the duplicated guard-indication register.

Here again, it is appropriate to take account the possible presence of a modifying instruction intended to modify the value of a guard indication contained in the guard-indication register, earlier in time than a guarded branching instruction. Thus, according to one implementation of the invention, every time the central unit receives a modifying instruction to modify the value of a guard indication before a branching instruction guarded by the guard indication, the validity check on the value of the guard indication contained in the duplicated register takes into account whether the modifying instruction has or has not been processed by the second unit, that is, the unit which actually holds the guard-indication register, namely the arithmetic and logic unit.

According to one implementation of the invention, the processor core includes a second memory of the FIFO-type associated with the second processing unit and intended to temporarily store the instructions, which are intended for the second processing unit. Every time the central unit receives a modifying instruction intended to modify the value of a guard indication, a counter, clocked by the clock signal, is initialized at an initial value corresponding to the number of clock cycles necessary for the modifying instruction to be stored in the second memory.

The validity check simultaneously takes into account the following: the current value of the counter, the presence or the absence of the modifying instruction in the memory, and whether the guard-indication register has or has not been updated by the modifying instruction after the latter has left the second memory.

According to one implementation of the method in accordance with the invention, every time an instruction is extracted from the second memory, a read counter is incremented. Likewise, every time an instruction is stored in the second memory, a write counter is incremented. Furthermore, every time an instruction modifying the value of a guard indication is stored in the second memory, the current value of the write counter is stored in memory. In determining the still-present character of a modifying instruction in the second memory, the result of the comparison of the memory-stored current value of the write counter with the current value of the read counter is taken into account.

In other words, it is determined whether a modifying instruction, which has already been written into the second memory, is still present in the second memory by comparing the memory-stored current value of the write counter with the current value of the read counter. In practice, the read counter and the write counter advantageously have an identical binary size equal to the depth of the second memory. According to one implementation of the method, an overflow bit, which changes value every time the corresponding counter comes back to its initial value, is then associated with each counter. In addition, every time an instruction modifying the value of a guard indication is stored in the second memory, the current value of the overflow bit of the write counter is likewise stored in memory.

Taking into account that the read pointer and the write pointer of the second memory may lie in two different "circular" windows, the determination of the still-present character of the modifying instruction in the second memory also takes into account the result of the comparison of the current value of the overflow bit of the read counter with the memory-stored value of the overflow bit of the write counter.

A further subject of the invention is a processor, in particular, a processor for digital signal processing. The processor includes a program memory containing the program instructions, a processor core containing several processing units and a central unit that is able, upon receipt of a program instruction, to issue the corresponding instructions to the various processing units.

According to one general characteristic of the invention, with the processor core being clocked by a clock signal, the central unit includes a branching module able to receive a branching instruction in the course of a current clock cycle, and to process the branching instruction in the course of the current cycle.

According to one embodiment of the invention, a first processing unit, for example the addressing unit, contains at least one address-pointing register. A branching instruction uses the content of at least one of the address-pointing registers. The central unit includes first validity-checking means that are able, at the start of the current cycle, to carry out a check on the validity of the content of the pointing register in question. The branching instruction is actually received by the central unit and processed if the content is declared valid. While in the opposite case, the branching instruction is kept on hold for processing until the content is declared valid.

According to one embodiment of the invention, the central unit includes, for each address-pointing register, a duplicated address-pointing register, the content of which is a copy of the corresponding address-pointing register. The first validity-checking means are then able to check the validity of the content of the corresponding duplicated register.

According to one embodiment of the invention, the central unit includes first deriving means able to derive a first flag signal representative of whether the modifying instruction has or has not been processed by the first unit, for example the addressing unit, every time the central unit receives the modifying instructions intended to modify the content of an address-pointing register and earlier in time than a branching instruction involving the address-pointing register.

The first deriving means include, for example, a counter associated with each duplicated address-pointing register, incrementation means able to increment the counter associated with the register every time a modifying instruction intended to modify the content of an address-pointing register is received by the central unit, and decrementation means able to decrement the counter every time the modifying instruction has been processed by the first processing unit. The first deriving means may also include comparison means able to compare the value of the counter with the zero value and to issue the first flag signal having a value representative of the result of the comparison.

The first validity-checking means checks the value of the first flag signal. The content of the duplicated register corresponding to the address-pointing register involved is declared valid if the value of the flag signal corresponds to a value of the counter that is equal to zero.

According to one embodiment of the invention, more particularly adapted to the case of guarded branching instructions, a second processing unit, for example, the arithmetic and logic unit, includes a guard-indication register. The central unit includes second validity-checking means able, in the presence of a guarded branching instruction, to carry out a check on the validity of the value of the guard indication assigned to the branching instruction contained in the guard-indication register, at the start of the current cycle. The guarded branching instruction is actually received by the central unit and processed if the value of the corresponding guard indication is declared valid. In the opposite case, the guarded branching instruction is kept on hold for processing until the value of the corresponding guard indication is declared valid.

According to one embodiment of the invention, the central unit includes a duplicated guard-indication register wherein its content is a copy of the guard-indication register incorporated in the second processing unit. The second validity-checking means is able to check the validity of the value of a guard indication contained in the duplicated guard-indication register.

According to one embodiment of the invention, the central unit includes second deriving means able to derive a second flag signal, every time the central unit receives a modifying instruction intended to modify the value of a guard indication and earlier in time than a branching indication guarded by the guard indication, representative of whether the modifying instruction has or has not been processed by the second unit. Thus, according to one embodiment of the invention, the processor core includes a second memory of the FIFO-type associated with the second processing unit and intended temporarily to store the instructions which are intended for the second processing unit.

The second deriving means include a counter clocked by the clock signal, and initialization means able to initialize the counter every time the central unit receives a modifying instruction intended to modify the value of a guard indication, at an initial value corresponding to the number of clock cycles necessary for the modifying instruction to be stored in the second memory. The second deriving means further includes logic means receiving, on one hand, a first logic signal representative of the current value of the counter and, on the other hand, a second logic signal representative of the presence or the absence of the modifying instruction in the memory and whether the guard-indication register has or has not been updated by the modifying instruction after the instruction has left the memory. The logic means issue the second flag signal and the second validity-checking means check the value of the second flag signal.

According to one embodiment of the invention, the second unit includes control means able to determine the presence or the absence of the modifying instruction in the memory. The control means include, for example, a read counter incremented every time an instruction is extracted from the second memory, a write counter incremented every time an instruction is stored in the second memory, and a set of individual registers associated respectively with the set of guard indications. The control means further include a first control unit able to store the current value of the write counter, every time an instruction modifying the value of a guard indication is stored in the second memory, in a main field of the individual register associated with the guard indication, and a second control unit able to determine the still-present character of the modifying instruction in the second memory. The second control unit includes comparison means able to compare the content of the main field of the individual register with the current value of the read counter.

According to one embodiment of the invention, the write counter and the read counter include an identical binary size equal to the depth of the second memory. An overflow bit, changing value every time the corresponding counter comes back to its initial value, is associated with each counter. Each individual register further includes a one-bit auxiliary field. The first control unit is then able to store the current value of the overflow bit of the write counter in the auxiliary field of the corresponding individual register, every time an instruction modifying the value of a guard indication is stored in the second memory. The second control unit then includes auxiliary comparison means able to compare the current value of the overflow bit of the read counter with the content of the auxiliary field. The auxiliary comparison means include, for example, an EXCLUSIVE NOR logic gate (known as an XNOR gate).

BRIEF DESCRIPTION OF THE DRAWINGS

Other advantages and characteristics of the invention will emerge on examining the detailed description of implementations and embodiments, which are not in any way limiting, and the attached drawings, in which.

DETAILED DESCRIPTION OF THE PREFERRED EMBODIMENTS

Figure 1:
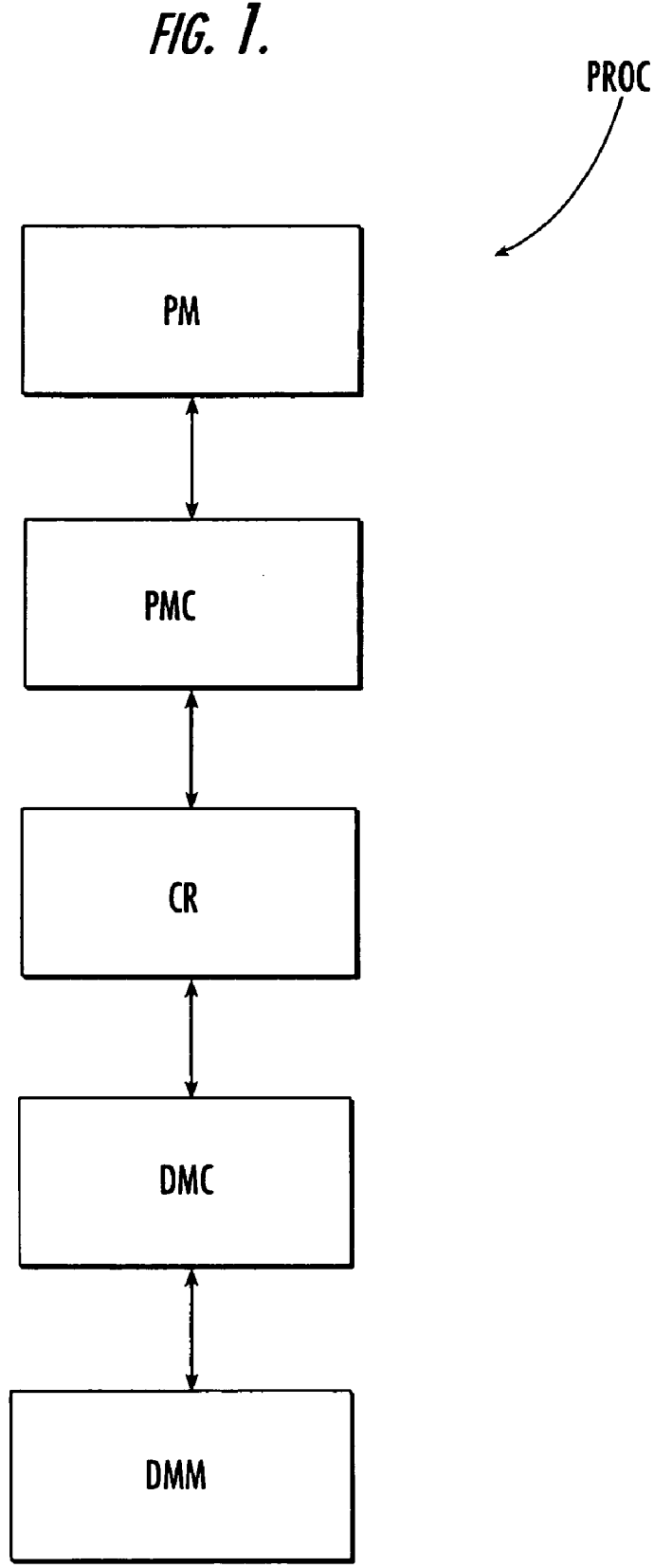
FIG. 1 diagrammatically illustrates the general architecture of a processor according to the invention.

In FIG. 1, the reference PROC designates a processor, for example, a processor for digital signal processing. The processor PROC includes a program memory PM containing the program instructions. The program memory is addressed by a memory controller PMC which interacts with the core CR of the processor. The address in the program memory is defined on the basis of the current value of a program counter PC. The core CR of the processor also communicates with a memory controller DMC which controls access to a data memory DMM, for example, such as two banks of SRAM memory.

Figure 2:
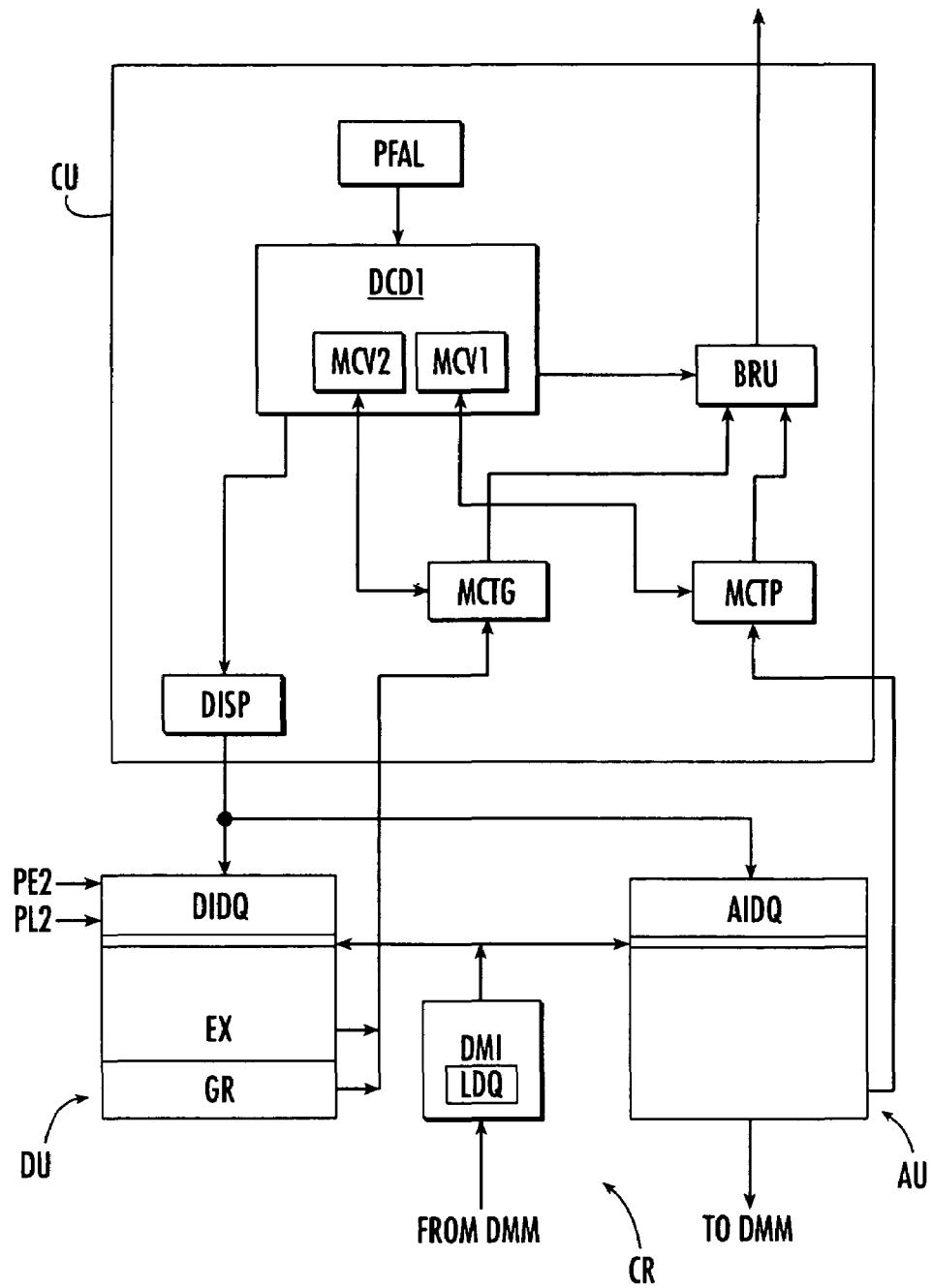
FIG. 2 diagrammatically illustrates, in more detail, the core of the processor according to the invention.

FIG. 2, shows that the core CR of the processor includes a central unit CU and several processing units, here, two different processing units DU and AU. The central unit CU is the master unit of the system. In general, it handles all the control activities. More particularly, it issues program addresses to the memory controller PMC, and distributes the corresponding instructions to the various processing units. More precisely, the central unit CU includes an interface PFAL with the memory controller PMC, which particularly carries out formatting of the instructions into instructions ready to be decoded.

The instructions are then decoded in a decoder which includes two successive decoding units. The overall function of the decoder is to convert each machine instruction into one or more micro-instructions which will be able to be dealt with by the various processing units. In the remainder of the text, for the sake of simplification, the term "instruction" will designate a micro-instruction.

One particular feature of the central unit CU of the processor according to the invention is that it includes the branching module BRU which processes the branching instructions. More precisely, the first decoding unit DCD1 will, in the presence of a branching instruction at the exit from the interface PFAL, issue the branching instruction, after a validity check to the branching module BRU. This takes place in the course of one cycle of the clock signal which clocks the processor core. According to the invention, from the moment when the decoding unit DCD1 has carried out a positive validity check, the details of which will be returned to later, the branching module BRU processes the branching instruction in the same current cycle and derives the new value of the program counter PC, which will make it possible to point to the new address selected in the program memory.

If, as will be seen in more detail later, the validity check proves to be negative, the decoding unit DCD1 does not issue the branching instruction to the branching module BRU and the branching instruction remains on hold in the interface PFAL. The various instructions of a branching instruction are decoded partly in the unit DCD1 and partly (typically in the course of the next clock cycle) in the other decoding unit at the exit from which are available the micro-instructions, which will be able to be processed by the processing units AU or DU.

Finally, routing means or circuitry DISP ("Dispatch") sends the instructions generated by the decoding unit to the processing units for which these instructions are intended. The processing unit DU is an arithmetic and logic unit which executes the majority of the arithmetic operations.

The unit AU is an addressing unit which performs actual address calculations necessary for addressing the operands in the memory. The unit AU includes all the registers necessary for the task, as well as address-pointing registers Px wherein "x" designates the number of the address-pointing register P. In general, a branching instruction relies on one of the address-pointing registers, for example the register P3, and uses the content of the register for calculating the new value of the program counter PC.

The unit AU includes a memory of the FIFO-type, referenced AIDQ, intended to store the instructions intended for the unit AU, in particular, the modifying instructions intended to modify the values of the address-pointing registers Px, in particular, the register P3. The processing unit DU includes a second memory of the FIFO-type, referenced DIDQ, intended to store the instructions intended for these units DU, in particular, as will be seen in more detail later, modifying instructions intended to modify the guard-indication values. In addition to these units DU and AU, a memory interface DMI is provided, which especially contains another memory of the FIFO-type, referenced LDQ, intended to receive and to store, temporarily, the data contained in the SRAM memory banks.

Finally, one of the processing units, for example the unit DU, includes a guard-indication register GR. The register stores the current values of all the guard indications, which are, for example, sixteen in number. The guard-indication register is situated at the bottom of the pipelined structure of the unit DU. In this context, the reference EX designates the pipelined structure of the unit DU stages. In the remainder of the text, and for the sake of simplification, it is assumed that the unit DU includes only a single pipeline stage between the exit from the memory DIDQ and the guard-indication register GR.

The processor described here is a decoupled architecture processor, allowing, after an initial latency time, a higher speed of execution of the instructions. The principle of a decoupled architecture is already known to the person skilled in the art, for example from the European Patent Application No. 949,565, or from the European Patent Application No. 1,050,799. The operating principle of a decoupled architecture will now be reiterated briefly, the person skilled in the art being able to refer for further details, if necessary, to the abovementioned European Patent Applications.

In a decoupled architecture, certain instructions calling on data stored in the data memory DMM are partitioned into a micro-instruction intended for the unit DU and into a micro-instruction intended for the unit AU to derive the memory data. Thus, for example, an instruction for loading memory-stored data into a register is partitioned into two micro-instructions or instructions. A first instruction is transmitted to the addressing unit AU, which calculates the actual address of the data in the data memory.

The other instruction, which is an instruction for loading into the register in question, is temporarily stored in the memory DIDQ associated with the arithmetic and logic unit. The second instruction remains on hold until the memory-stored data, derived by the addressing unit, is available. When it is available, the register concerned is then actually updated. After an initial latency time, the addressing unit has drawn ahead of the arithmetic and logic unit. The machine is then "decoupled". On the other hand, seen from the arithmetic and logic unit, the "imaginary" latency is zero.

Figure 3:
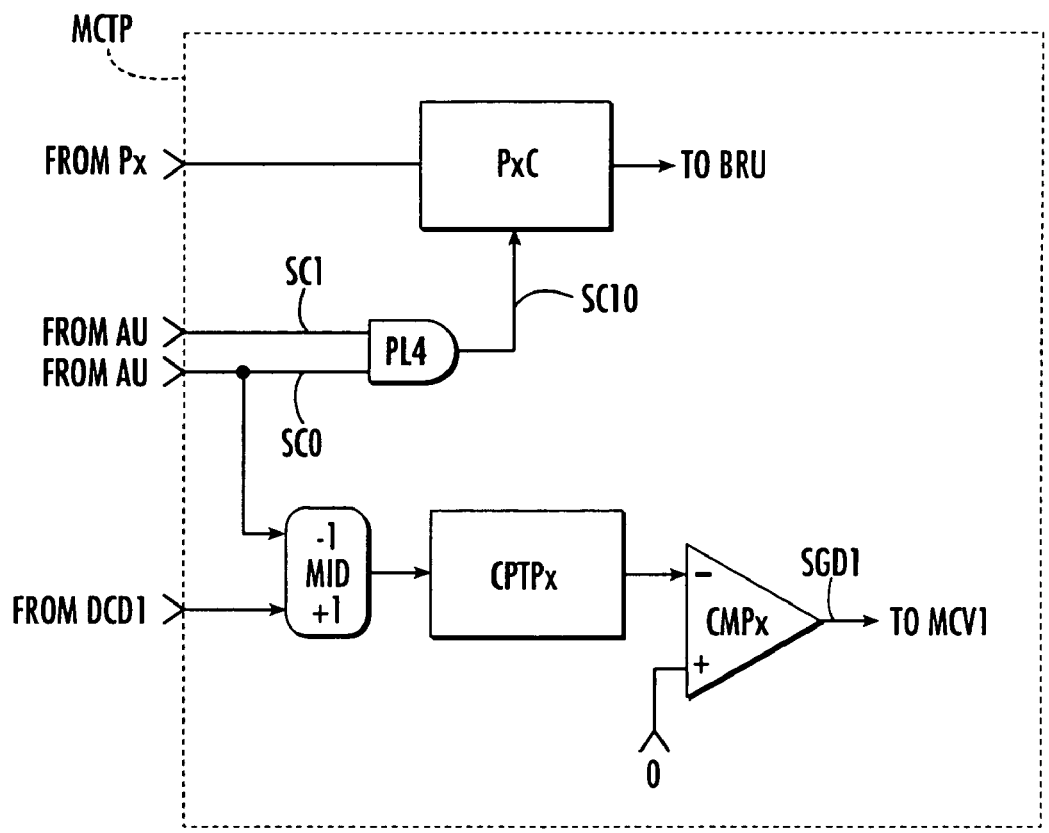
FIG. 3 illustrates, in more detail, a part of the central unit allowing handling of the branching instructions according to the invention.

The handling of the branching instructions according to the invention will now be described, by referring more particularly to FIGS. 2, 3 and 4. It is assumed, in this regard, that a branching instruction uses the content of at least one of the address-pointing registers Px, for example, the register P3 contained in the unit AU.

In a general way, the unit CU includes first validity-checking means MCV1, able, at the start of the current cycle of the clock signal and in the course of which the decoding unit DCD1 is ready to receive a branching instruction, to carry out a check on the validity of the content of the pointing register in question, Px. In fact, the validity check is carried out on a duplicated address-pointing register PxC. The duplicated register PxC is physically linked, by an electrical conductor, to the address-pointing register Px contained in the unit AU.

In fact, as will be seen in more detail below, the actual duplication of the content of the register Px in the duplicated register PxC is conditioned by a control signal SC10 issued by a logic gate PL4 forming part of first deriving means MCTP. The first deriving means MCTP are able, in a general way, every time the central unit receives a modifying instruction intended to modify the content of an address-pointing register, for example the register Px, the modifying instruction being earlier in time than a branching instruction involving the register Px, to derive a first flag signal SGD1 representative that the modifying instruction has or has not been processed by the unit AU.

It is necessary, before using the content of a duplicated register, to ensure that there is no modifying instruction in the pipeline which is earlier in time but which has not yet updated the corresponding architectural address-pointing register. This is necessary because the architectural address-pointing registers which are liable to be modified are situated in the unit AU, and therefore are at much lower levels of the pipeline.

To that end, the first deriving means MCTP include a counter CPTPx associated with each duplicated address-pointing register PxC, incrementation-decrementation means MID, and comparison means CMPx able to compare the value of the counter with the value zero and to issue the first flag signal SGD1 wherein the value is representative of the result of the comparison.

The incrementation means are able to increment the counter CPTPx every time a modifying instruction intended to modify the content of an address-pointing register is received by the decoder DCD1 of the central unit. The decrementation means are able to decrement the counter every time the modifying instruction has been processed by the unit AU. The decrementation means are controlled by a logic signal SC0 issued by the unit AU, which indicates that the modifying instruction has actually been processed by the unit AU.

The presence of the logic AND gate, referenced PL4, is necessary only to deal with the case where the modifying instructions are also guarded. If no modifying instruction is guarded, the signal SC0 would be equal to the signal SC10 and would be used to validate the recopy of the content of the address-pointing register Px in the duplicated register PxC.

However, in the case where a modifying instruction is guarded, it may very well not be executed because of the value of the guard indication which is associated with it. However, in this case, it should nevertheless have been regarded as having been processed by the unit AU, which has the effect of decrementing the counter CPTPx. In contrast, depending on the value of the guard indication, it is appropriate to modify or not to modify the content of the duplicated register PxC. The logic signal SC1 takes into account the value of the guard indication of a guarded modifying instruction.

Needless to say, upon initialization of the processor, the counter CPTPx is initialized at the value zero. Every time the central unit receives a branching instruction involving the register Px, the first validity-checking means MCV1, which are in fact means simply testing the 0 or 1 value of the signal SGD1, carry out a check on the validity of the content of the duplicated register PxC. The duplicated register is regarded as having a valid content if the signal SGD1 has a logic value corresponding to a zero value of the counter CPTPx. If this is the case, the branching instruction is processed by the branching module BRU. In the opposite case, it is kept on hold for processing.

Figure 4:
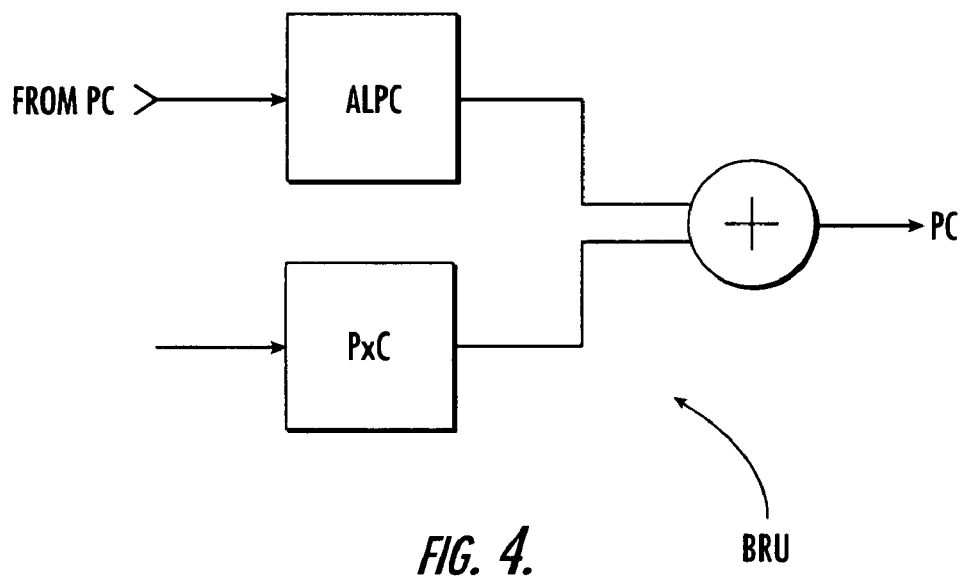
FIG. 4 diagrammatically illustrates, in more detail, a branching-module architecture according to the invention.

FIG. 4 very briefly illustrates one implementation of the execution of a branching instruction. A register ALPC contains the current value of the program counter PC. The value is added to the value of the duplicated register PxC to supply the new value of the counter PC.

The case of guarded branching instructions will now be described, referring more particularly to FIG. 5 et seq. As shown in FIG. 2, the central unit includes second validity-checking means MCV2 able, in the presence of a guarded branching instruction and at the start of the current cycle, to carry out a check of the validity of the value of the guard indication assigned to the guarded branching instruction. The guard indication is contained in the guard-indication register GR. The guarded branching instruction will then actually be received by the central unit and processed by the branching module BRU in the same current clock cycle, if the value of the corresponding guard indication is declared valid. In the opposite case, the guarded branching instruction is kept on hold for processing until the value of the corresponding guard indication is declared valid.

Figure 5:
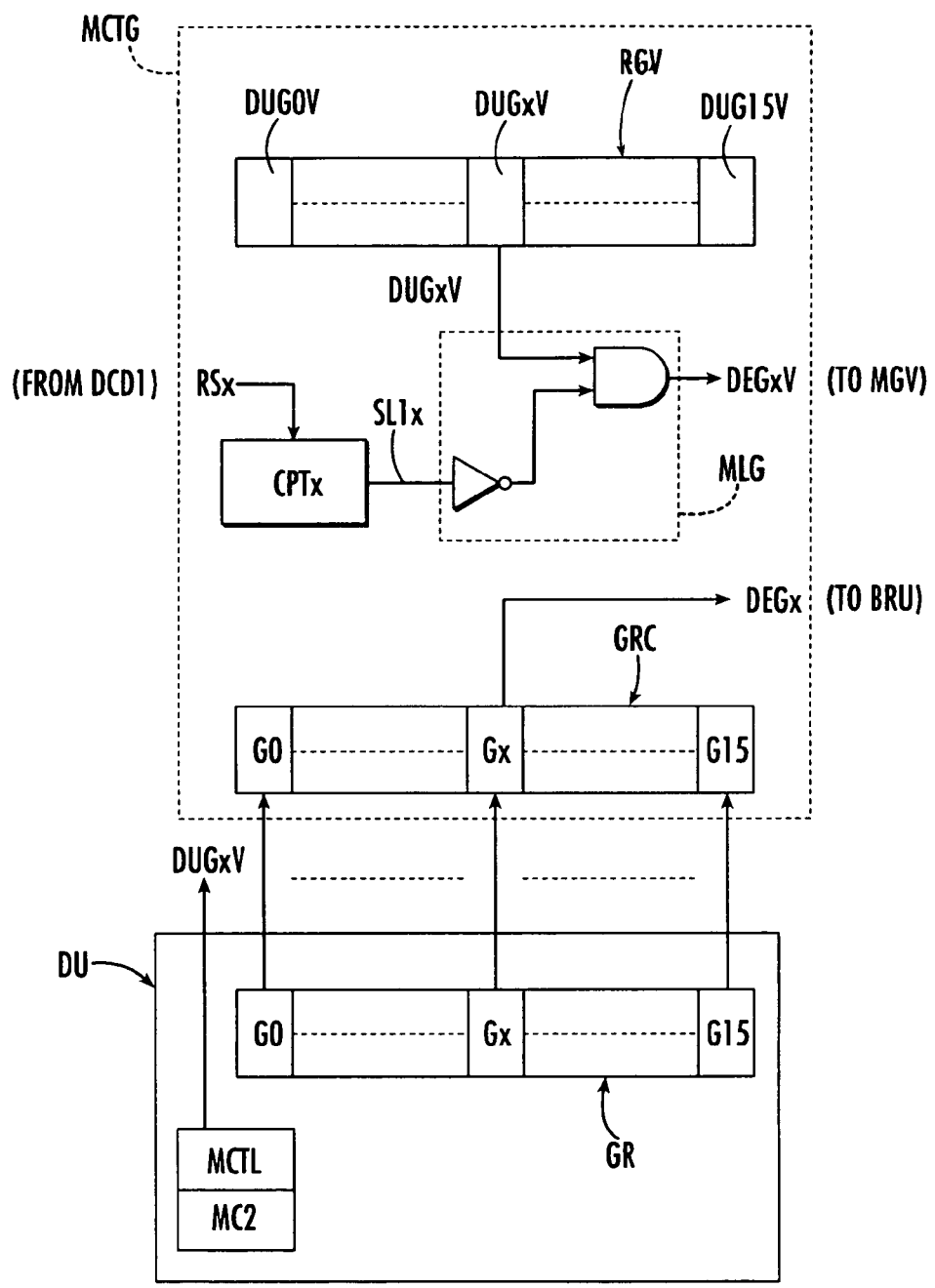
FIGS. 5 and 6 diagrammatically illustrate, in more detail, circuitry for allowing the handling of guarded branching instructions according to the invention.

In this regard, the central unit includes a duplicated guard-indication register GRC, as shown in FIG. 5, in which the content is a copy of the guard-indication register GR. The duplicated register GRC is physically linked to the register GR. The central unit further includes second deriving means MCTG able to derive a second flag signal DEGxV representative of whether the modifying instruction has or has not been processed by the unit DU. The second deriving means MCTG is able to derive the second flag signal every time the central unit receives a modifying instruction GMIx intended to modify the value of a guard indication Gx, and earlier in time than a branching instruction guarded by the guard indication Gx.

To determine whether such a modifying instruction has or has not been processed by the unit DU, it is appropriate to check that: the modifying instruction is not situated between the decoder output and the input of the memory DIDQ, that is, such a modifying instruction is not still present in the memory DIDQ, and it has actually been processed by the pipeline stage EX of the unit DU to update the guard-indication register.

To take into account that a modifying instruction GMIx can be situated between the decoder and the input of the memory DIDQ, a provision is made to use a counter CPTx, (in reality a down-counter) clocked by the clock signal and initialized by the decoder unit DCD1, by using a signal RSx when the latter decodes the instruction GMIx. The counter is then initialized at an initial value corresponding to the number of clock cycles necessary for the modifying instruction GMIx to be stored in the memory DIDQ. By way of example, the number of clock cycles may be equal to two or three.

Thus, as long as the counter CPTX has not reached the value 0, an instruction GMIx, intended to modify the value of the guard indication Gx and earlier in time than a branching instruction guarded by the guard indication Gx, is situated between the decoder DCD1 and the input of the memory DIDQ. To determine whether such a modifying instruction GMIx is present or absent in the memory DIDQ, control means MCTL are used. The control means MCTL are incorporated in the unit DU in which the structure and the operation of which will now be described in more detail, by referring more particularly to FIGS. 6, 7 and 8.

Figure 6:
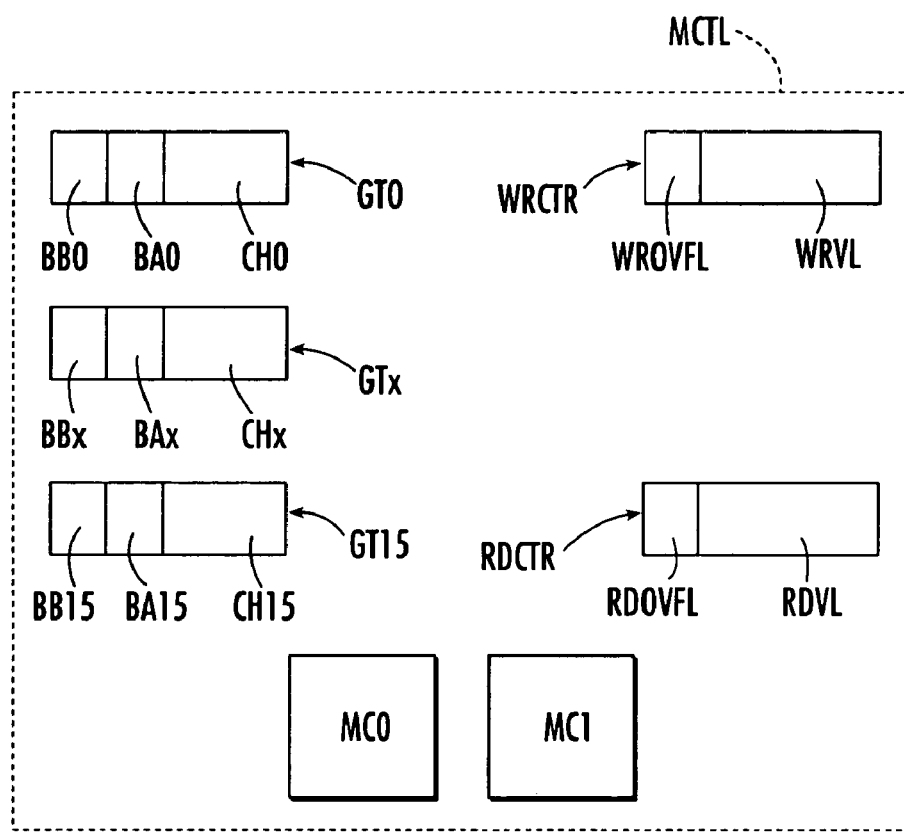

In one embodiment, like the one illustrated in FIG. 6, the control means MCTL include a circular read counter RDCTR incremented every time an instruction, whatever it may be, is extracted from the second memory DIDQ. The means MCTL further include a circular write counter WRCTR incremented every time an instruction, whatever it may be, is stored in the second memory DIDQ.

In the example described here, the two counters have an identical size. The identical size is a number of bits necessary to code, in binary mode, the depth of the second memory DIDQ. In the example illustrated, because the memory DIDQ has a depth of four, the counters are counters over two bits, wherein the current value WRVL of the write counter WRCTR and the current value RDVL of the read counter RDCTR are two-bit words. Needless to say, the depth of the FIFO may be greater.

Furthermore, an overflow bit (WROVFL in the case of the write counter and RDOVFL in the case of the read counter) is associated with each counter. The overflow bit value changes value every time the corresponding counter comes back to its initial value. In other words, at the rate of the successive circular counting windows, the overflow bit successively takes the values 0 and 1.

In addition to the write counter and the read counter, the control means MCTL include a set of individual registers GT0-GT15, associated respectively with the set of the guard indications G0-G15. Thus, the individual register GTx is associated with the guard indication Gx bearing the number "x". Each individual register GTx includes a main field CHx, as well as a first auxiliary field BAx and a second auxiliary field BBx. The meaning and the function of these auxiliary fields, in the example described here, are one-bit fields and will be returned to in further detail.

Figure 7:
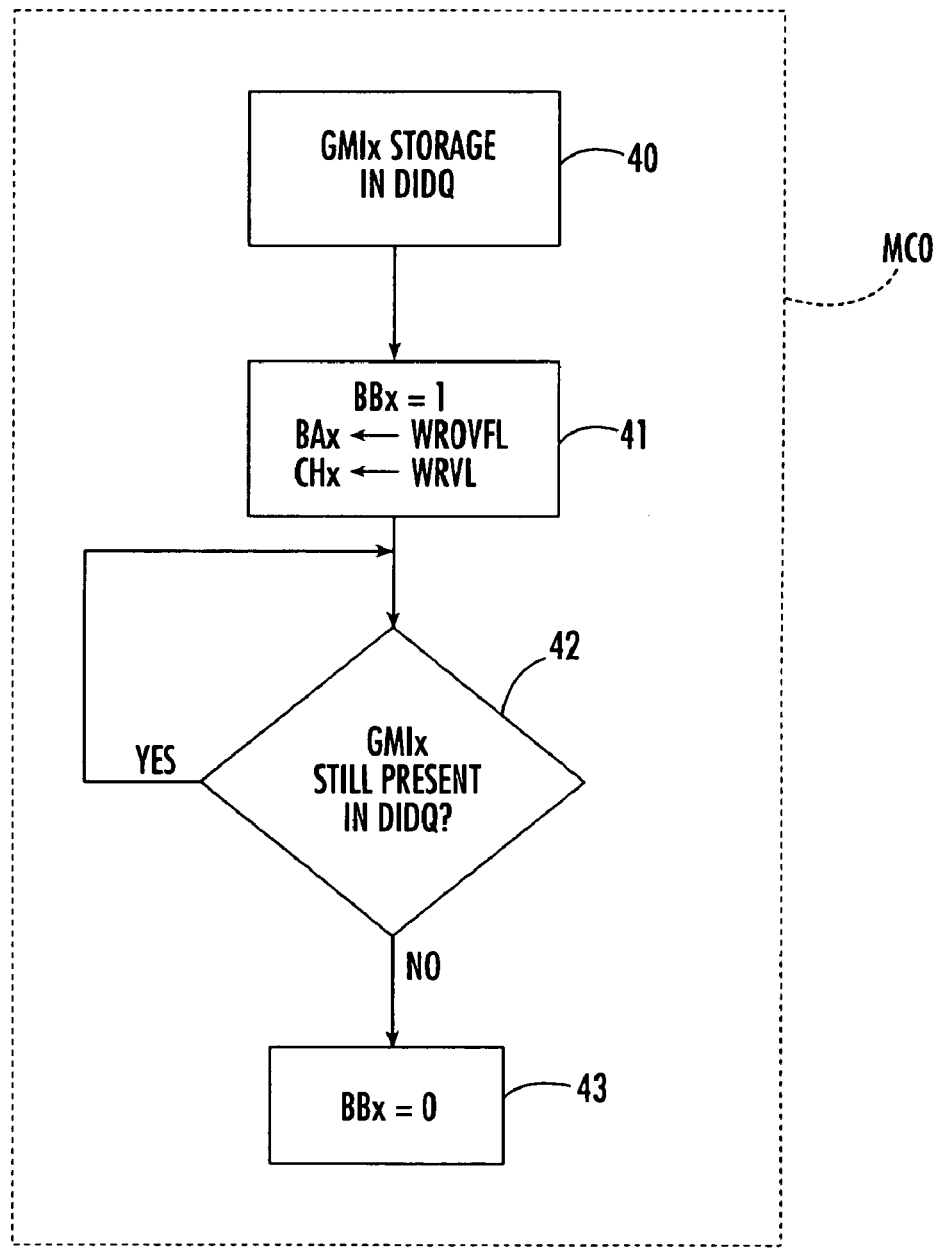
FIGS. 7 and 8 diagrammatically illustrate flowcharts relating to an implementation of the method for handling guarded branching instructions according to the invention.
Figure 8:
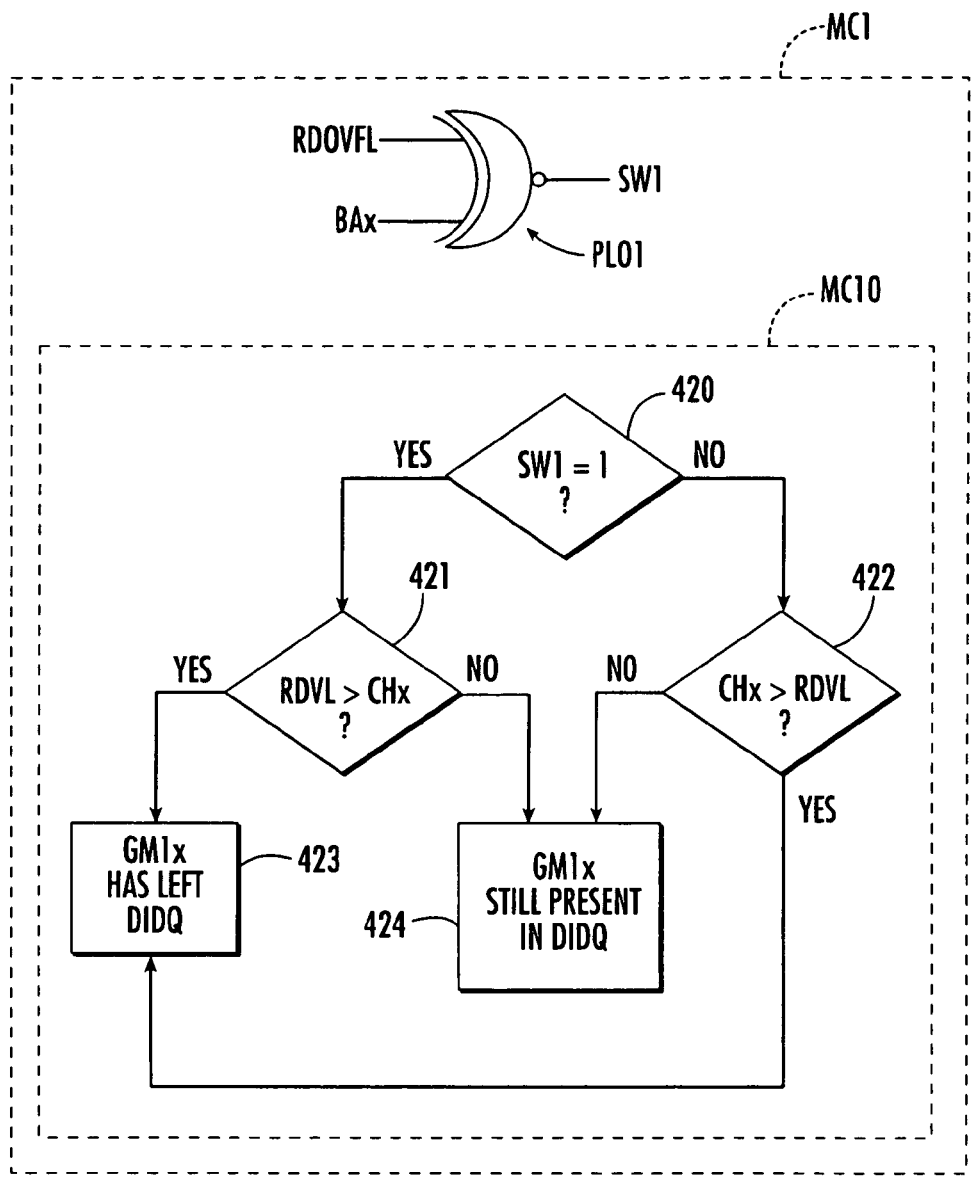

The control means MCTL, furthermore, include three control units MC0-MC2 in which the functionality will now be described in more detail by referring to FIGS. 7 et seq. The first control unit MC0 is able, every time an instruction GMIx modifying the value of the guard indication Gx is stored in the second memory DIDQ (stage 40, FIG. 7), to store the current value WRVL of the write counter WRCTR in the main field CHx of the individual register GTx associated with the guard indication Gx. Furthermore, the bit BBx (second auxiliary field) of the individual register GTx, initially at 0, takes the value 1 to indicate that a modifying instruction GMIx has actually been stored in the memory DIDQ (stage 41).

Finally, the current value of the overflow bit WROVFL of the write counter is stored in the first auxiliary field (one bit) BAx of the individual register GTx. In fact, the value stored in the main field CHx of the individual register GTx in which the size, in terms of bits, is equal to the depth of the second memory (here two bits), represents the "symbolic" position of the last modifying instruction GMIx written into the memory DIDQ. The first auxiliary field BAx, intended to receive the current value of the overflow bit of the write counter, makes it possible to take into account and to manage the respective eventual positions of the pointers in different circular counting windows.

In stage 42, it will now be determined whether the modifying instruction GMIx is still present in the memory DIDQ, or whether it has actually left the memory. This is carried out by the second control unit MC1 and will now be described in more detail by referring, more particularly, to FIG. 8. Basically, the second control unit MC1 includes comparison means MC10 which will compare the content of the main field CHx of the individual register GTx with the current value RDVL of the read counter. The comparison will make it possible to determine whether the instruction GMIx is still present or has left the memory DIDQ.

That being so, to take into account the effects of the circular counting windows, a provision is made for the second control unit MC1 to also include auxiliary comparison means that are formed from a first EXCLUSIVE NOR (XNOR) logic gate, referenced PLO1. The logic gate is intended to derive a first logic signal SW1 from the content of the first auxiliary field BAx and from the value of the overflow bit RDOVFL of the read counter.

In other words, the logic signal SW1 indicates whether the read pointer PL2 is in the same circular window as the position of the last instruction GMIx affecting the guard indication Gx. The value of the first logic signal SW1 is then tested in stage 420. If the logic signal is at 0, it is tested in stage 422 to determine whether the value of the word contained in the main field CHx is strictly higher than the current value RDVL of the read counter. If this is the case, it means that the instruction GMIx has left the memory DIDQ (stage 423), and the bit BBx is then set to 0 (stage 43, FIG. 7).

If, in contrast, the value of the word contained in the main field CHx is not strictly higher than the current value RDVL of the read counter, it means that the modifying instruction GMIx is still present in the memory DIDQ (stage 424). In this case, the bit BBx is kept at 1. If, in contrast, in stage 420, the logic signal SW1 is at 1, the comparison means MC10 will test whether the current value of the read counter RDVL is strictly higher than the word contained in the main field CHx of the individual register GTx (stage 421). If this is the case, it means that the modifying instruction GMIx has left the memory DIDQ (stage 423). In this case, the bit BBx is set to 0 (stage 43, FIG. 7). In the opposite case, it means that the modifying instruction GMIx is still present in the memory DIDQ (stage 424).

The means MC0 and MC1 can be produced easily by using logic-synthesis tools. Once the instruction GMIx has left the memory DIDQ, it is appropriate to check whether it has or has not been processed by the stage EX to update the value of the guard indication Gx. The verification is the role of the control unit MC2 (FIGS. 5 and 9).

Figure 9:
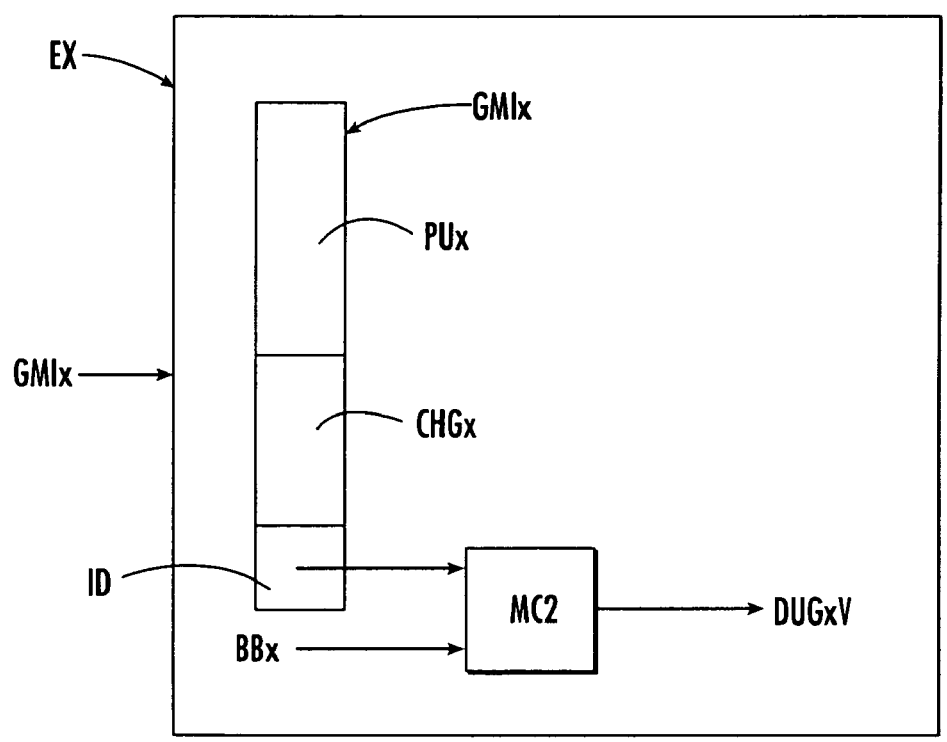
FIG. 9 diagrammatically illustrates, in more detail, another part of the circuitry for allowing checking of the actual processing of an instruction modifying the guard-indication register, within the arithmetic and logic unit.

As shown in FIG. 9, an instruction GMIx includes a usable field PUx representative of the proper content, (called the instruction content), a field CHGx identifying the guard indication Gx, and an identification bit ID in which the logic value represents whether a valid GMIx instruction is or is not present. More precisely, if the bit ID is equal to 1, for example, it means that the instruction GMIx has not yet been processed by the stage EX.

The control unit MC2 therefore receives the identification bit ID and the bit BBx, as input, and issues a logic signal DUGxV. If the logic signal is equal to 0, it means that a GMIx instruction is still in the course of execution. In contrast, if the signal DUGxV is equal to 1, it means that the GMIx instruction has been executed and that the value of the guard indication Gx has been updated.

Returning now to FIG. 5, it is seen that the second deriving means MCTG include a register RGV containing the sixteen values of the logic signals DUGxV. The means MCTG further include logic means MLG, here, formed from a logic AND gate and an inverter. The logic means receive, on one hand, the first logic signal SL1x representative of the zero or non-zero value of the counter CPTx and, on the other hand, the second logic signal DUGxV output by the register RGV.

The output of the logic AND gate supplies the second flag signal DEGxV associated with the GMIx instruction and the checking of the logic value, which will be carried out by the second validity-checking means MCV2, at the start of the current cycle and in the course of which the decoder DCD1 is made ready to receive the guarded branching instruction. Depending on the result of this validity check, the guarded branching instruction will or will not be issued and processed by the branching module BRU. If it is to be processed by the branching module BRU, then the branching module BRU will use the value of the guard indication Gx contained in the duplicated register GRC (signal DEGx). Depending on the value Gx, the branching instruction will actually be processed or not processed.

That which is claimed is:

1. A method of handling branching instructions using a processor comprising a program memory storing program instructions, and a processor core comprising a plurality of processing units and a central unit connected thereto, the processing units comprising a first processing unit including at least one address-pointing register, the central unit issuing instructions to the processing units based upon the program instructions, the method comprising:

clocking the processor core with a clock signal;

receiving a branching instruction in the course of a current clock cycle, the branching instruction using a content of the at least one address-pointing register;

executing the received branching instruction in the course of the current clock cycle; and checking validity of the content of the at least one address-pointing register at a start of the current clock cycle so that the branching instruction is received by the central unit and executed if the content is declared valid, and, in an opposite case, the branching instruction is kept on hold for executing until the content is declared valid.

2. A method according to claim 1 further comprising recopying the content of the at least one address-pointing register into at least one corresponding duplicated address-pointing register; and wherein the checking is of the at least one corresponding duplicated address-pointing register.

3. A method according to claim 2 wherein every time the central unit receives a modifying instruction intended to modify the content of the at least one address-pointing register, and earlier in time than a branching instruction involving the at least one address-pointing register, the check of validity of the content of the corresponding duplicated register takes into account that this modifying instruction has or has not been executed by the first processing unit.

4. A method according to claim 3 wherein every time a modifying instruction intended to modify the content of the at least one address-pointing register is received by the central unit, a counter associated with the at least one address-pointing register is incremented; wherein every time this modifying instruction has been executed by the addressing unit, the counter is decremented; wherein when a branching instruction involving this register is ready to be issued to the central unit, the validity check includes the check on the value of the counter; and wherein the content of the duplicated register corresponding to said address-pointing register involved is declared valid if the value of the counter is equal to zero.

5. A method according to claim 1 wherein a second processing unit from among the plurality thereof includes a guard-indication register; wherein in the presence of a guarded branching instruction, a check on validity of a guard indication assigned to the branching instruction and contained in the guard-indication register is carried out at a start of the current clock cycle; and wherein the guarded branching instruction is received by the central unit and executed, if the value of the corresponding guard indication is declared valid, and, in the opposite case, this guarded branching instruction is kept on hold for processing until the value of the corresponding guard indication is declared valid.

6. A method according to claim 5 wherein the content of the guard-indication register is recopied into a duplicated guard-indication register; wherein the check on the validity of the value of a guard indication is a check on the validity of the value of the corresponding guard indication contained in the duplicated guard-indication register.

7. A method according to claim 6 wherein every time the central unit receives a modifying instruction intended to modify the value of a guard indication and earlier in time than a branching instruction guarded by the guard indication, the validity check on the value of the guard indication contained in the duplicated guard-indication register takes into account that this modifying instruction has or has not been executed by the second unit.

8. A method according to claim 7 wherein the processor core includes a FIFO memory associated with the second processing unit and intended to temporarily store instructions which are intended for the second processing unit; wherein every time the central unit receives a modifying instruction intended to modify the value of a guard indication, a counter, clocked by the clock signal, is initialized at an initial value corresponding to a number of clock cycles for this modifying instruction to be stored in the FIFO memory; and wherein the validity check simultaneously takes into account the current value of the counter, the presence or the absence of the modifying instruction in the FIFO memory, and whether the guard-indication register has or has not been updated by this modifying instruction after the latter has left the FIFO memory.

9. A method according to claim 8 wherein every time an instruction is extracted from the FIFO memory, a read counter is incremented; wherein every time an instruction is stored in the FIFO memory, a write counter is incremented; wherein every time an instruction modifying the value of a guard indication is stored in the FIFO memory, the current value of the write counter is stored in FIFO memory; and wherein determining of a still-present character of this modifying instruction in the FIFO memory includes the comparison of the memory-stored current value of the write counter with the current value of the read counter.

10. A method according to claim 9 wherein the read counter and the write counter have an identical binary size equal to a depth of the FIFO memory; wherein an overflow bit changing value every time the corresponding counter comes back to its initial value is associated with each counter; wherein every time an instruction modifying the value of a guard indication is stored in the FIFO memory, the current value of the overflow bit of the write counter is likewise stored in the FIFO memory; and wherein determining of the still-present character of this modifying instruction in the FIFO memory also includes the comparison of the current value of the overflow bit of the read counter with the memory-stored value of the overflow bit of the write counter.

11. A method of handling branching instructions using a processor comprising a program memory storing program instructions, and a processor core comprising a plurality of processing units and a central unit connected thereto, the processing units comprising a first processing unit including at least one address-pointing register, the central unit issuing instructions to the processing units based upon the program instructions, the method comprising:
receiving at the central core a branching instruction during a current clock cycle and executing the received branching instruction during the current clock cycle, the branching instruction using a content of the at least one address-pointing registers; and
checking validity of a content of the at least one address-pointing register at a start of the current clock cycle so that the branching instruction is received by the central unit and executed if the content is declared valid, and, in an opposite case, the branching instruction is kept on hold for executing until the content is declared valid.

12. A processor comprising:
a program memory for storing program instructions; and
a processor core being clocked by a clock signal and comprising a plurality of processing units and a central unit connected thereto, said processing units comprising a first processing unit including at least one address-pointing register, said central unit for issuing instructions to said processing units based upon corresponding program instructions and comprising
a branching module for receiving a branching instruction during a current clock cycle, and executing the branching instruction during the current clock cycle, the branching instruction using a content of the at least one address-pointing register, and
first validity-checking means being able, at the start of the current clock cycle, to carry out a check on validity of the content of the at least one address-pointing register;
the branching instruction being received by said central unit and executed if the content is declared valid, and, in an opposite case, the branching instruction is kept on hold in the program memory until the content is declared valid.

13. A processor according to claim 12 wherein said central unit comprises, for each address-pointing register, a duplicated address-pointing register a content of which is a copy of the corresponding address-pointing register; and wherein said first validity-checking means checks validity of the contents of the corresponding duplicated address-pointing register.

14. A processor according to claim 13 wherein said central unit comprises first deriving means able, every time the central unit receives a modifying instruction intended to modify the content of an address-pointing register, and earlier in time than a branching instruction involving this address-pointing register, to derive a first flag signal representative that this modifying instruction has or has not been executed by said first unit.

15. A processor according to claim 14 wherein said first deriving means comprise:
a counter associated with each duplicated address-pointing register;
incrementation means able, every time a modifying instruction intended to modify the content of an address-pointing register is received by said central unit, to increment the counter associated with this register;
decrementation means, able to decrement the counter every time this modifying instruction has been executed by said first processing unit; and
comparison means able to compare a value of the counter with a zero value and to issue the first flag signal having a value which is representative of the result of the comparison;
wherein said first validity-checking means check the value of the first flag signal, the content of the duplicated register corresponding to said address-pointing register involved being declared valid if the value of the flag signal corresponds to a value of the counter equal to zero.

16. A processor according to claim 15 wherein a second processing unit includes a guard-indication register; wherein said central unit includes second validity-checking means able, in a presence of a guarded branching instruction, to carry out a check on validity of a value of a guard indication assigned to said branching instruction and contained in the guard-indication register, at the start of the current cycle; and wherein the guarded branching instruction is received by said central unit and executed if the value of the corresponding guard indication is declared valid, and, in the opposite case, this guarded branching instruction is kept on hold for executing until the value of the corresponding guard indication is declared valid.

17. A processor according to claim 16 wherein said central unit includes a duplicated guard-indication register a content of which is a copy of the guard-indication register; and wherein said second validity-checking means are able to check the validity of the value of a guard indication contained in the duplicated guard-indication register.

18. A processor according to claim 17 wherein said central unit includes second deriving means able, every time the central unit receives a modifying instruction intended to modify a value of a guard indication and earlier in time than a branching instruction guarded by the guard indication, to derive a second flag signal representative that this modifying instruction has or has not been executed by said second unit.

19. A processor according to claim 18 wherein said processor core includes a FIFO memory associated with said second processing unit and intended temporarily to store instructions which are intended for this second processing unit; and wherein said second deriving means comprise:
 a counter clocked by the clock signal;
 initialization means able, every time the central unit receives a modifying instruction intended to modify a value of a guard indication, to initialize said counter at an initial value corresponding to a number of clock cycles necessary for this modifying instruction to be stored in the FIFO memory; and
 logic means receiving a first logic signal representative of a current value of said counter and receiving a second logic signal representative of the presence or the absence of the modifying instruction in the memory, and representative that the guard-indication register has or has not been updated by this modifying instruction after the instruction has left said EIFO memory;
 wherein said logic means issue the second flag signal; and
 wherein said second validity-checking means check the value of the second flag signal.

20. A processor according to claim 19 wherein the second unit comprises control means able to determine a presence or absence of the modifying instruction in the memory, said control means comprising:
 a read counter incremented every time an instruction is extracted from the second memory;
 a write counter incremented every time an instruction is stored in the second memory;
 a set of individual registers associated respectively with the set of guard indications;
 a first control unit able, every time an instruction modifying a value of a guard indication is stored in the second memory, to store a current value of the write counter in a field of the individual register associated with this guard indication; and
 a second control unit able to determine a still-present character of this modifying instruction in the memory, and including means of comparing the field of the individual register with a current value of the read counter.

21. A processor according to claim 20 wherein said write counter and read counter have an identical size equal to a depth of the second memory; wherein an overflow bit, changing value every time a corresponding counter comes back to its initial value, is associated with each counter; wherein each individual register further includes a one-bit auxiliary field; wherein the first control unit is able, every time an instruction modifying the value of a guard indication is stored in the second memory, also to store a current value of an overflow bit of the write counter in the auxiliary field of the corresponding individual register; wherein the second control unit includes auxiliary comparison means able to compare a current value of an overflow bit of the read counter with a content of the auxiliary field.

22. A processor according to claim 21 wherein the auxiliary comparison means include an EXCLUSIVE NOR logic gate.

23. A processor according to claim 12 having a decoupled architecture.

24. A method of handling branching instructions using a processor comprising a program memory storing program instructions, and a processor core comprising a plurality of processing units and a central unit connected thereto, the central unit issuing instructions to the processing units based upon the program instructions, the processing units comprise a first processing unit including at least one address-pointing register, the method comprising:
 clocking the processor core with a clock signal;
 receiving a branching instruction in the course of a current clock cycle, the branching instruction uses the content of the at least one address-pointing register;
 processing the received branching instruction in the course of the current clock cycle; and
 checking validity of the content of the at least one address-pointing register at the start of the current clock cycle so that the branching instruction is received by the central unit and processed if the content is declared valid, and, in an opposite case, the branching instruction is kept on hold for processing until the content is declared valid.

25. A method of handling branching instructions using a processor comprising a program memory storing program instructions, and a processor core comprising a plurality of processing units and a central unit connected thereto, the processing units comprise a first processing unit including a guard-indication register, the central unit issuing instructions to the processing units based upon the program instructions, the method comprising:
 clocking the processor core with a clock signal;
 receiving a branching instruction in the course of a current clock cycle;
 processing the received branching instruction in the course of the current clock cycle;
 carrying out, in the presence of a guarded branching instruction, a check on validity of a guard indication assigned to the branching instruction and contained in the guard-indication register at a start of the current clock cycle; and
 receiving the guarded branching instruction by the central unit and processing, if the value of the corresponding guard indication is declared valid, and, in the opposite case, this guarded branching instruction is kept on hold for processing until the value of the corresponding guard indication is declared valid.

26. A method of handling branching instructions using a processor comprising a program memory storing program instructions, and a processor core comprising a plurality of processing units and a central unit connected thereto, the processing units comprise a first processing unit including at least one address-pointing register, the central unit issuing instructions to the processing units based upon the program instructions, the method comprising:
 receiving at the central core a branching instruction during a current clock cycle, the branching instruction uses the content of the at least one address-pointing registers;
 processing the received branching instruction during the current clock cycle; and
 checking validity of the content of the at least one address-pointing register at the start of the current clock cycle so that the branching instruction is received by the central unit and processed if the content is declared valid, and, in an opposite case, the branching instruction is kept on hold for processing until the content is declared valid.

27. A processor comprising:
a program memory for storing program instructions;
a processor core being clocked by a clock signal and comprising a plurality of processing units and a central unit connected thereto, said central unit for issuing instructions to said processing units based upon corresponding program instructions;
a first processing unit includes at least one address-pointing register, a branching instruction uses the content of at least one of the address-pointing registers;
said central unit comprising
   a branching module for receiving a branching instruction during a current clock cycle, and processing this branching instruction during the current clock cycle; and
   first validity-checking means able, at the start of the current cycle, to carry out a check on validity of the content of the at least one address-pointing register;
said branching instruction is received by the central unit and processed if the content is declared valid, and, in an opposite case, the branching instruction is kept on hold in the program memory until the content is declared valid.

28. A method of handling branching instructions using a processor comprising a program memory storing program instructions, and a processor core comprising a plurality of processing units and a central unit connected thereto, the processing units having a first processing unit including a guard-indication register, the central unit issuing instructions to the processing units based upon the program instructions, the method comprising:
   clocking the processor core with a clock signal;
   receiving a branching instruction in the course of a current clock cycle;
   executing the received branching instruction in the course of the current clock cycle; and
   checking, in the presence of a guarded branching instruction, on validity of a guard indication assigned to the branching instruction and contained in the guard-indication register at a start of the current clock cycle, the guarded branching instruction being received by the central unit and executed, if the value of the corresponding guard indication is declared valid, and, in the opposite case, this guarded branching instruction is kept on hold for executing until the value of the corresponding guard indication is declared valid.

29. A processor with a decoupled architecture comprising:
a program memory for storing program instructions; and
a processor core being clocked by a clock signal and comprising a plurality of processing units and a central unit connected thereto, said central unit for issuing instructions to said processing units based upon corresponding program instructions;
said central unit comprising a branching module for receiving a branching instruction during a current clock cycle, and executing this branching instruction during the current clock cycle.

* * * * *

UNITED STATES PATENT AND TRADEMARK OFFICE
CERTIFICATE OF CORRECTION

PATENT NO. : 7,370,182 B2  
APPLICATION NO. : 10/082816  
DATED : May 6, 2008  
INVENTOR(S) : Andrew Cofler, Anne Merlande and Sebastien Ferroussat It is certified that error appears in the above-identified patent and that said Letters Patent is hereby corrected as shown below:

Column 11, Line 33  Delete: "CPTX"  
Insert: --CPTx--

Column 17, Line 28  Delete: "EIFO"  
Insert: --FIFO--

Signed and Sealed this

Eleventh Day of November, 2008

JON W. DUDAS  
*Director of the United States Patent and Trademark Office*